Figure 1:
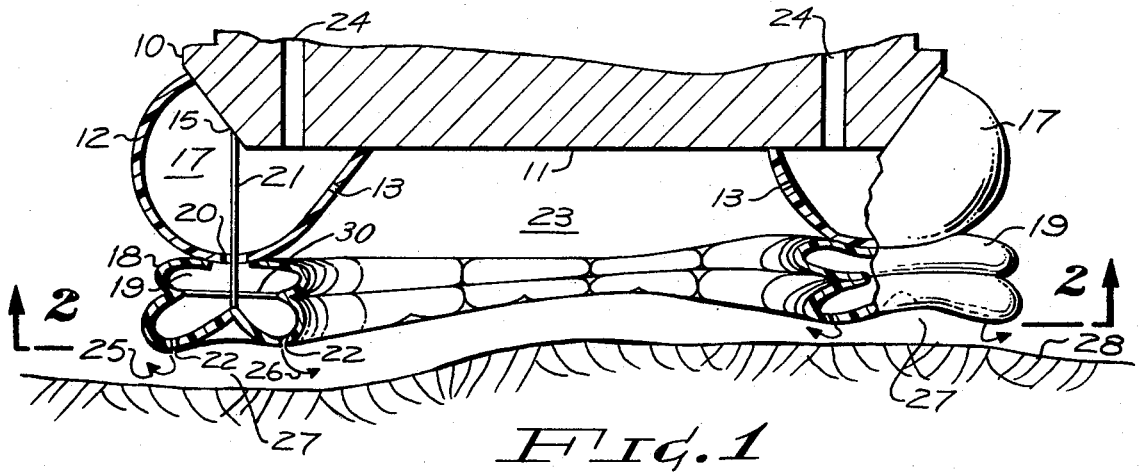

United States Patent

Eggington

[15] 3,700,065
[45] Oct. 24, 1972

[54] FLUID CUSHION CELLS FOR FLUID CUSHION VEHICLES

[72] Inventor: Wilfred J. Eggington, Claremont, Calif.

[73] Assignee: Aerojet-General Corporation, El Monte, Calif.

[22] Filed: Aug. 30, 1971

[21] Appl. No.: 176,212

Related U.S. Application Data

[63] Continuation of Ser. No. 802,620, Feb. 26, 1969, abandoned.

[52] U.S. Cl. ........................... 180/128, 180/121
[51] Int. Cl. ................................. B60v 1/16
[58] Field of Search ....... 180/118, 121, 124, 128, 119

[56] References Cited

UNITED STATES PATENTS

| 3,267,882 | 8/1966 | Rapson et al. | 180/124 X |
| 3,333,650 | 8/1967 | Hardy et al. | 180/128 |
| 3,371,737 | 3/1968 | Hall | 180/121 X |
| 3,463,264 | 8/1969 | Duthion et al. | 180/127 |
| 3,478,836 | 11/1969 | Eckered et al. | 180/128 |
| 3,524,517 | 8/1970 | La Fleur | 180/124 |

*Primary Examiner*—Kenneth H. Betts
*Attorney*—Edward O. Ansell and D. Gordon Angus

[57] ABSTRACT

According to the present disclosure, a deformable chamber is provided beneath the rigid body of a fluid cushion vehicle. A plurality of expansible chambers are mounted to the deformable chamber and in fluid communication therewith. Orifice means provides fluid communication between each expansible chamber and a region below it to form a fluid cushion cell. According to one feature of the present disclosure, the deformable chamber is confined to a region below the periphery of the body so as to define another cushion cell within its bounds.

6 Claims, 2 Drawing Figures

PATENTED OCT 24 1972

3,700,065

INVENTOR.
WILFRED J. EGGINGTON
BY
D. Gordon Angus
ATTORNEY

FLUID CUSHION CELLS FOR FLUID CUSHION VEHICLES

This application is a continuation of application Ser. No. 802,620 filed Feb. 26, 1969, since abandoned which is a continuation-in-part of my co-pending patent application Ser. No. 725,670 filed May 1, 1968 for "Fluid Cushion Cells for Fluid Cushion Vehicle", since issued as Pat. No. 3,631,938, and assigned to the same assignee as the present application.

This invention relates to cushion cells for fluid cushion vehicles.

In my prior co-pending patent application there is described apparatus for stabilizing the body of a fluid cushion vehicle to prevent minor fluctuations while traveling over a rough or irregular terrain. Stabilization of the vehicle is effectuated by a valving mechanism which automatically increases and decreases the volume of fluid supplied to a fluid cushion cell so that appropriate fluid rates are maintained while the vehicle experiences depressions and rises in the surface elevation of the terrain. Particularly, an expansible chamber is provided so that if the pressure below the cushion cell decreases, as may be occasioned by a decrease in the elevation of the adjacent terrain surface, the pressure in the cushion cell decreases and the pressure differential between the expansible chamber and the cushion cell increases so that the volumetric size of the expansible chamber increases so as to lower the bottom of the expansible chamber relative to the vehicle. Furthermore, fluid is passed into the cushion cell from the expansible chamber.

It is an object of the present invention to provide a chamber disposed about the periphery of a fluid cushion vehicle to form a cushion cell beneath said vehicle.

It is another object of the present invention to provide a deformable chamber which supports individual expansible chambers and which forms a cushion cell beneath the vehicle. The expansible chambers are capable of adjusting in elevation in accordance with elevation changes of the adjacent terrain to react against the deformable chamber to shift the center of gravity of the vehicle.

In accordance with the present invention, a deformable chamber is mounted beneath the body of a fluid cushion vehicle. A plurality of expansible chambers are mounted to the deformable chamber and in fluid communication therewith. Means is provided in the expansible chambers to form individual cushion cells beneath each expansible chamber.

According to an optional and desirable feature of the present invention, the deformable chamber is mounted at the periphery of the vehicle and fluid under pressure in the fluid cushion cells formed beneath the expansible chambers escapes into the region bounded by the deformable and expansible chambers to pressurize that region. The pressurized fluid in the region bounded by the chambers reacts against the surface of the terrain and against the vehicle to aid in the lifting of the vehicle.

According to another feature of the present invention, undulation of the terrain beneath the vehicle operates on respective expansible chambers which in turn operate on the deformable chamber to shift the center of gravity of the deformable chamber. The shifted center of gravity of the deformable chamber aids in stabilizing the vehicle.

Figure 2:
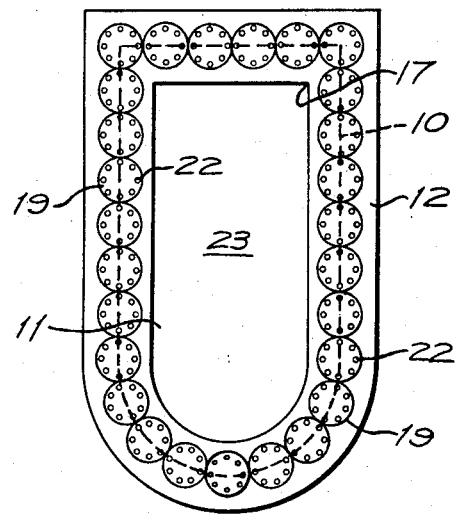

The above and other features of this invention will be more fully understood from the following detailed description and the accompanying drawings, in which:

FIG. 1 is a sideview elevation, partly in cutaway cross-section, of a portion of a fluid cushion vehicle having chambers which when inflated form cushion cells in accordance with the presently preferred embodiment of the present invention; and FIG. 2 is a bottom view of the vehicle illustrated in FIG. 1 taken at line 2—2 in FIG. 1.

In the drawings there is illustrated a fluid cushion vehicle having a rigid housing or frame 10 defining an undercarriage 11. Membrane 12 which may, for example, be constructed of sealed fabric such as neoprene-coated dacron or neoprene-coated nylon having a thickness between about 0.005 and 0.015 inch, is mounted to housing 10 at the periphery thereof to form a substantially enclosed deformable chamber 17. Membranes 18 are mounted beneath deformable chamber 17 to form expansible chambers 19. Preferably, chambers 19 are substantially bellowed shape as illustrated in the drawings so that they may expand and contract in volume. Chambers 19 are in fluid communication through orifice 20 with deformable chamber 17. Bias means 21 is mounted to the center of membrane 18 at its lowestmost portion and supports membrane 18 by attachment to point 15 on frame 10. Bias means 21, may be a suitable elastic band or spring. The cell chamber 19 in vertical cross section when inflated may conform to a cloverleaf configuration. This is clearly shown in FIG. 1, the shape being imparted by the attachment of the restraint by bias means 21 and the horizontal cross-ties 30 between the inside and outside walls of chamber 19. Orifice 22 are provided through the lowermost portion of membrane 18 to provide fluid communication between chambers 19 and regions 27 between membranes 18 and surface 28 of the terrain. Although FIG. 2 illustrates a single row of orifices 22 in the lowermost portion of each expansible chamber, it is to be understood that the orifices 22 preferably form a curtain of air jets around each region 27 and therefore several rows of orifices or a single circular slot around the region may be desirable for particular applications.

Deformable chamber 17 and the individual expansible chambers 19 together form a cushion cell 23 beneath the vehicle. As illustrated in the drawings, cushion cell 23 is bounded by chambers 17 and 19. If desired, additional orifices 13 may be provided in membrane 12 to provide fluid communication between deformable chambers 17 and cell 23.

In operation of the apparatus illustrated FIGS. 1 and 2, fluid under pressure is admitted through inlet openings 24 in housing 10 into chambers 17. The fluid passes through orifices 20 into expansible chambers 19 formed by membranes 18. The fluid displaces membranes 12 and 18 so as to inflate the chambers to a size dependent upon the size of the respective membranes and the bias force provided by bias means 21. Pressurized fluid in chambers 19 passes through orifices 22 to form an air cushion in region 27 below chamber 19. Pressurized air beneath chambers 19 escapes in the direction of arrows 25 and 26 to the region on each side of the chamber.

Air escaping from region 27 in the direction of arrow 26 escapes into chamber 23 to maintain the pressure in that chamber. The bulging shape of the chambers 17 at the periphery is thus maintained by pressure within chambers 17 and 23. Pressurized fluid in region 27 beneath the individual chambers 19 as well as the pressurized fluid in chamber 23 reacts against the surface 28 of the terrain to thereby lift against membrane 18 and surface 11 of the vehicle. The pressure against the bottom of membranes 12 also reacts against the bottom of the vehicle. Pressure against the bottom of the vehicle lifts the vehicle from the surface 28 of the terrain. If desired, orifices 13 may provide direct fluid communication between chambers 17 and cell 23.

If the vehicle moves in the direction from right to left in FIG. 1 so that the surface below the vehicle decreases in altitude, the pressure within region 27 below chamber 19 decreases due to the loss of pressurized fluid escaping through the enlarged distance between membranes 18 and surface 28 of the terrain. The decreased pressure within region 27 alters the pressure differential between region 27 and in chamber 19 so that chamber 19 expands downwardly until the pressurized fluid within chamber 19 is balanced by the elastic force provided by bias means 21, the pressure within region 27 and the tension in membrane 18. Furthermore, the pressure within chamber 19 decreases thereby altering the pressure differential between chambers 19 and the adjacent portion of chamber 17. The altered pressure differential between chambers 17 and 19 alters the force on chamber 17 so that chamber 17 deforms downwardly and inwardly. Since the position of chamber 17 is shifted, the center of gravity of the vehicle also shifts. Specifically, when the pressure in region 27 decreases, chamber 19 expands and decreases in pressure. The decreased pressure in chamber 19 permits chamber 17 to push downwardly on chamber 19 and to compress inwardly due to the pressure in chamber 23 and of the atmosphere. The shift continues until the forces are again balanced, and results in a shift in the center of gravity of chamber 17.

If the vehicle moves from left to right in FIG. 1 so that the surface of the terrain is increasing in altitude, the pressure within the region 27 below chamber 19 increases due to the decreased space between chamber 19 and surface 28 of the terrain. The increased pressure within region 27 reacts against chamber 19 to raise membrane 18 to decrease the size of chamber 19. Chamber 19 decreases in size until a balance is reached between the fluid pressurizing chamber 19 and the force of the pressurized fluid in region 27, bias means 21 and the tension in membrane 18. Likewise, due to the increased pressure in chamber 19, the pressure differential between chamber 19 and the adjacent portion of chamber 17 is altered to alter the forces on chamber 17 to thereby shift its center of gravity. Hence, chambers 17 and 19 react to closely follow the terrain of surface 28. Thus, the cushion cells automatically adjust to fluctuations in the elevation of the terrain.

One feature of this invention resides in the fact that when the pressure within region 27 increases due to a rise in elevation of the adjacent terrain thereby decreasing the size of chambers 17 and 19, less fluid is passed through the orifice due to the increased pressure in region 27. Likewise, when the elevation of the terrain decreases, more fluid is passed through orifices 22 to region 27 below cushion 19 due to the decreased pressure in the region 27. Hence, the volume of fluid passed by orifices 22 is self-regulating in accordance with changes of the elevation of the terrain. Furthermore, the pressure within chamber 23 is relatively insensitive to changes in elevation of the terrain.

Reaction of the individual expansible chambers 19 against chambers 17 causes alteration of the center of gravity of the chamber and aids in the stabilization of the vehicle when traversing an irregular or undulating surface.

The present invention thus provides cushion cells which are capable of adjusting in elevation and in center of gravity in accordance with fluctuations in the elevation of the surface terrain. The cells provide mobility over irregular and uneven surfaces such as bodies of water rough ground. The cells are easily fabricated and effective in use.

This invention is not to be limited by the embodiment shown in the drawings and described in the description, which is given by way of example and not of limitation, but only in accordance with the scope of the appended claims.

We claim:

1. In a fluid cushion vehicle having a rigid body, a cushion cell comprising: first membrane means mounted to and depending from said body defining a deformable chamber and forming with said body a compartment for retaining a cushion of pressurized fluid therein as a support for the vehicle above a surface; an inlet opening into said deformable chamber adapted to supply said deformable chamber with pressurized fluid; second membrane means mounted to and depending from said first membrane means defining a plurality of individual expansible chambers, each chamber of said plurality being individually mounted to said first membrane means and in lateral touching relationship with the adjacent chamber of said plurality, said first membrane means and said second membrane means defining said compartment, each chamber capable of expansion and contraction in a vertical direction independently of any other chamber in said plurality; a plurality of first orifice means providing fluid communication between said deformable chamber and each of said expansible chambers; and outlet means providing fluid communication between each of said expansible chambers and a region below each of said expansible chambers whereby fluid under pressure is passed from each of said expansible chambers to said region.

2. Apparatus according to claim 1 further including bias means supporting said second membrane means, said bias means providing for the expansion or contraction of each of said expansible chambers in a vertical direction independently, in dependent upon the fluid pressure in each said chamber.

3. Apparatus according to claim 2 further including means confining said expansible chamber in a lateral direction relative to said lateral touching relationship.

4. The system of claim 3 wherein each said expansible chamber, in vertical section, conforms, when provided with pressurized fluid, to cloverleaf configuration.

5. A system according to claim 1, further including second orifice means in said first membrane means providing fluid communication between said deformable chamber and said compartment.

6. Apparatus according to claim 1 wherein said outlet means providing fluid communication between each of said expansible chambers and the region beneath them comprise means for providing a curtain of air jets around the bottom periphery of said expansible chambers.

* * * * *